US006929545B2

(12) United States Patent
Vancura

(10) Patent No.: US 6,929,545 B2
(45) **Date of Patent: *Aug. 16, 2005**

(54) CASINO GAME WITH HIDDEN BONUS FEATURE

(75) Inventor: Olaf Vancura, Las Vegas, NV (US)

(73) Assignee: Mikohn Gaming Corporation, Las Vegas, NV (US)

( * ) Notice: Subject to any disclaimer, the term of this patent is extended or adjusted under 35 U.S.C. 154(b) by 176 days.

This patent is subject to a terminal disclaimer.

(21) Appl. No.: 10/196,607

(22) Filed: Jul. 16, 2002

(65) Prior Publication Data

US 2003/0176210 A1 Sep. 18, 2003

Related U.S. Application Data

(63) Continuation-in-part of application No. 10/099,742, filed on Mar. 14, 2002.

(51) Int. Cl.[7] .................................................. A63F 13/00
(52) U.S. Cl. ............................................ 463/25; 463/16
(58) Field of Search ....................... 463/1, 9–13, 16–20, 463/25–27, 30–31, 35, 37, 42; 273/138.1, 143 R, 139, 429–432, 459–461

(56) References Cited

U.S. PATENT DOCUMENTS

| | | | | | |
|---|---|---|---|---|---|
| 5,921,864 | A | * | 7/1999 | Walker et al. | 463/9 |
| 6,113,098 | A | * | 9/2000 | Adams | 273/143 R |
| 6,251,013 | B1 | * | 6/2001 | Bennett | 463/13 |
| 6,270,411 | B1 | * | 8/2001 | Gura et al. | 463/20 |
| 6,315,666 | B1 | * | 11/2001 | Mastera et al. | 463/31 |
| 6,364,766 | B1 | * | 4/2002 | Anderson et al. | 463/16 |
| 6,413,160 | B1 | * | 7/2002 | Vancura | 463/16 |
| 6,676,512 | B2 | * | 1/2004 | Fong et al. | 463/20 |
| 2002/0147042 | A1 | * | 10/2002 | Vuong et al. | 463/40 |
| 2003/0100362 | A1 | * | 5/2003 | Horniak et al. | 463/25 |
| 2003/0176217 | A1 | * | 9/2003 | Vancura | 463/25 |

FOREIGN PATENT DOCUMENTS

GB 2262642 A * 6/1993 .......... G07F/17/34

OTHER PUBLICATIONS

Bueschel, Richard M., Lemons, Cherries and Bell Fruit Gum, Royal Bell Books, 1st Ed., pp99–100.*
U.S. Appl. No. 60/099,959, Vancura, filed Sep. 11, 1998.
U.S. Appl. No. 09/372,560, filed Aug. 11, 1999, Vancura.

* cited by examiner

*Primary Examiner*—Scott E. Jones
(74) *Attorney, Agent, or Firm*—Dorr, Carson, Sloan, Birney & Kramer, P.C.

(57) ABSTRACT

During play of a casino game a hidden bonus feature unknown to the player occurs as no separate indicator is activated. The occurrence of the hidden bonus feature may be at a random statistical frequency or other event. When the player inputs a correct response to the hidden bonus feature, the player receives an additional award. If a correct response is not received or if the hidden bonus feature is ignored, the player does not receive any further award. The hidden bonus feature does not affect the outcome of the play of the casino game.

23 Claims, 7 Drawing Sheets

CASINO GAME WITH HIDDEN BONUS FEATURE

RELATED INVENTION

This application is a continuation-in-part of U.S. application Ser. No. 10/099,742 filed on Mar. 14, 2002 entitled CASINO GAME WITH HIDDEN BONUS FEATURE.

BACKGROUND OF THE INVENTION

1. Field of the Invention

The present invention relates to casino games and, more particularly, to casino games having bonusing features.

2. Background

Casino bonusing games are increasingly popular when placed in operation with underlying casino gaming machines such as, for example, slot machines. Such bonusing games not only attract players but provide additional gaming excitement. In the play of such casino bonusing games, instructions on how to play the bonus game are usually placed on the face of the machine or can be read by a player in a display through suitable "help" input signals such as on a touch screen, a separate button, etc. The same is true of the underlying casino game wherein a player has the ability to obtain instructions for the play of the game. By following the instructions, the player is informed of the play characteristics of both the underlying casino gaming machine and/or the casino bonus game.

UK Patent Application GB2262642A describes a fruit machine with a "special status mode" in which a separate indicator alerts the player to a "secret" feature. In this mode, a non-explanatory indicating sign, e.g. a light, appears on the display screen, and usually the display screen gives no instructions as to how to obtain an award. A special sequence of inputs, e.g. button pushes, is required to obtain an award. The '642A reference describes a "secret" feature whose presence is not really secret because it is known to the player (i.e., by use of the separate indicator). But what is secret is how the player should properly respond when the indicator is illuminated (i.e., pushing a special sequence of multiple button pushes). Hence, the proper time at which to enter the button sequence is not kept secret, but the secret lies in "cracking the code" of what to do to achieve the award. Stated another way, the '642A reference informs a player with a separate illuminated indicator that a bonus opportunity exists, but the player must figure out by guessing what to do. While interesting to players, this approach has the disadvantage of frustrating players who know they ought to do something, but then repeatedly err while trying to crack the code. In conjunction with the British adaptive logic approach (in which odds/payoffs for subsequent game trials are adaptively dependent on previous results), this approach has the undesirable side effect of potentially frustrating poor players (who by virtue of not knowing what to do, will see the "secret feature" more often, enhancing and reinforcing feelings of failure) while also potentially frustrating the good players (who by virtue of winning more with the "secret feature," are apt to see the feature less often, leading to aggravation while waiting to see the feature again).

A need therefore exists to provide enhancements to hidden bonus features in an underlying casino gaming machine and/or even in a casino bonus game to further award the player in a surprise fashion without providing a separate physical indicator to indicate to the player that a "secret" feature is present. A further need exists for gaming machines that are operated under strict U.S. guidelines in which the selection of game trial outcomes are independent events, and not adaptive in nature.

A need exists for hidden bonus features to be secret without any associated separate indicators. But once discovered, simple enough so that a player need not memorize complex inputs to be awarded a prize. By combining and fulfilling these needs, different kinds of players may be accommodated and provided a rewarding experience. In particular, poor players, by virtue of not recognizing the hidden bonus feature, are not therefore frustrated at "not knowing what to do," while good players, as they succeed in finding and obtaining the hidden awards, are not penalized by decreased frequencies of winning, etc.

A need exists to make the value of the hidden bonus feature a function of the time taken to react to it. A need exists to make the hidden bonus feature awards random as a means of keeping player suspense even once the hidden bonus feature is identified.

SUMMARY OF THE INVENTION

The present invention solves the aforesaid problem by providing a hidden bonus feature in a casino game such as an underlying gaming machine or an underlying game having a casino bonus game without providing any external or separate indicator concerning the hidden bonus feature.

A method is set forth for further awarding a player of a casino game. The player normally plays a casino game. During play of the casino game, a hidden bonus feature occurs such as through a display. The hidden bonus feature may occur at a random statistical frequency or other event, so that the hidden bonus feature suddenly occurs. While the existence of the hidden bonus feature may be made known to the player, there is no separate indicator that this is the hidden bonus feature. Upon display or occurrence of the hidden bonus feature, the player must then provide a correct response and when a correct response is received, the player receives an additional award. If a correct response is not received, the player does not receive any further award.

DETAILED DESCRIPTION OF THE INVENTION

Overview.

Figure 1:
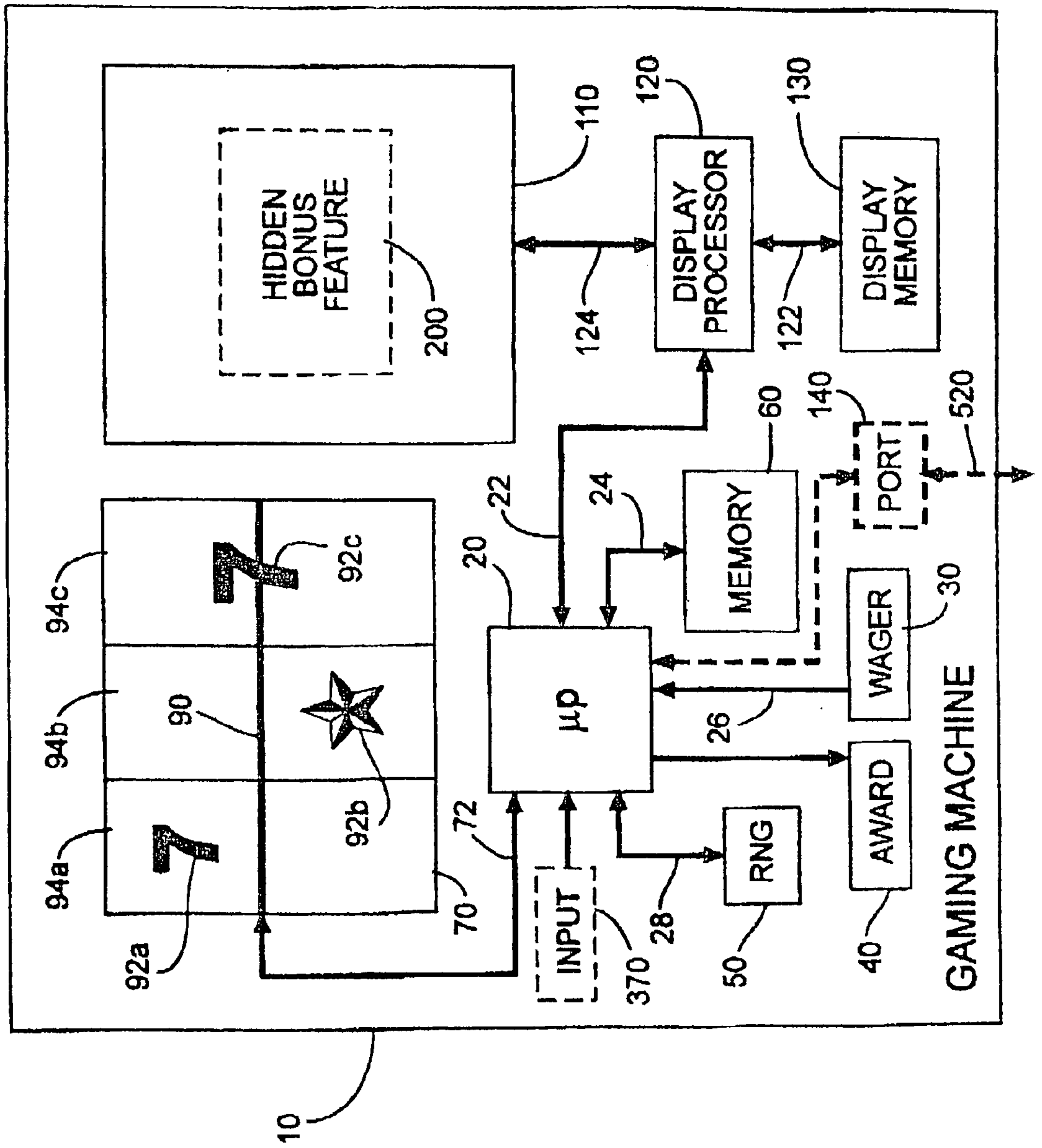
FIG. 1 sets forth the hardware configuration of a casino game incorporating the hidden bonus feature of the present invention.

In FIG. 1 is shown an embodiment of a gaming machine 10 such as a standard slot machine modified to incorporate the present invention. The hidden bonus feature of the present invention can be used in many different types of casino games. The slot machine 10, itself, is conventional and may comprise a number of different designs. The block diagram hardware components of such a slot machine 10 as shown in FIG. 1 are illustrative only and include a microprocessor, computer or controller 20 interconnected 26 to a device 30 for receiving bets or wagers from players. The device, 30 can be of any suitable design or construction and can be for example, but not limited to, a bill reader, coin acceptor, credit device, credit card reader, ticket reader, smart card reader, debit card reader, or any combination thereof. How a wager is received in device 30 is immaterial to the teachings of the present invention. The microprocessor 20 is also connected to an award feature 40 which can be, for example, but not limited to, a display showing current available player credits and the associated separate devices for delivering payouts to the player such as: a coin or ticket dispenser, a device for delivering payout information to a smart card; etc. The payout or award may be made to the player in a variety of ways. Furthermore, the award can be any type of an award, such as but not limited to: a monetary value, a free game play, a comp, a physical item such as a car, etc.

The microprocessor 20 is usually connected 28 to a random number generator (RNG) 50 which may be a separate hardware component or a software module within memory 60. The microprocessor 20 is interconnected 24 to memory 60 and interconnected 72 to display 70 showing slot reels 94*a*, 94*b* & 94*c*. Slot machine 10 is shown in functional block diagrams and conventional devices, ports, busses, buffers, etc. are not shown.

In FIG. 1, symbols 92 are shown which are also conventional in play of conventional slot machines. Three reels 94*a*, 94*b*, and 94*c* are illustrated in display 70 showing symbols 92*a*, 92*b*, and 92*c*. Any number of reels 94 could be utilized and any number of symbols 92 can also be utilized. While one pay line 90 is shown, it is to be expressly understood that conventional slot machines have a plurality of pay lines and such pay lines do not need to be linear but could zigzag over the face of the reels 94. The hidden bonus feature of the present invention is independent of the type of casino gaming machine 10 and can be implemented in any suitable casino game such as: video poker, keno, etc.

In FIG. 1, the microprocessor 20 is further interconnected 22 over a two-way bus to display processor 120. Display processor 120 is interconnected over two-way communication channel 124 with a display 110 and is also interconnected over a memory bus 122 with a display memory 130. The display 110, display processor 120, and the display memory 130 can contain game-enhancing video, graphics, etc. with the hidden bonus feature 200 occurring.

It is to be expressly understood that in some designs for the hardware of the present invention, microprocessor 120 can drive over 22 the display 110 without using a separate display processor 20 and display memory 130. For example, in a video poker gaming machine 10, the display 70 could display play of the underlying gaming machine 100*a* with the occurrence of a hidden bonus in the same display 70 under control of the microprocessor 20. The method of the present invention as set forth in the following works with a casino game using a single display such as only display 70 in FIG. 1 for play of the underlying gaming machine with the hidden bonus feature 200.

In FIG. 1 when the hidden bonus feature 200 occurs (whether in a separate video display 110 or in display 70), the player, as will be explained later, inputs a signal (usually by touching the display screen) to obtain an additional bonus award. FIG. 1 is the embodiment of the present invention for a gaming machine in which the hidden bonus feature occurs in either the play of the underlying game or in a separate display used for other purposes.

Figure 2:
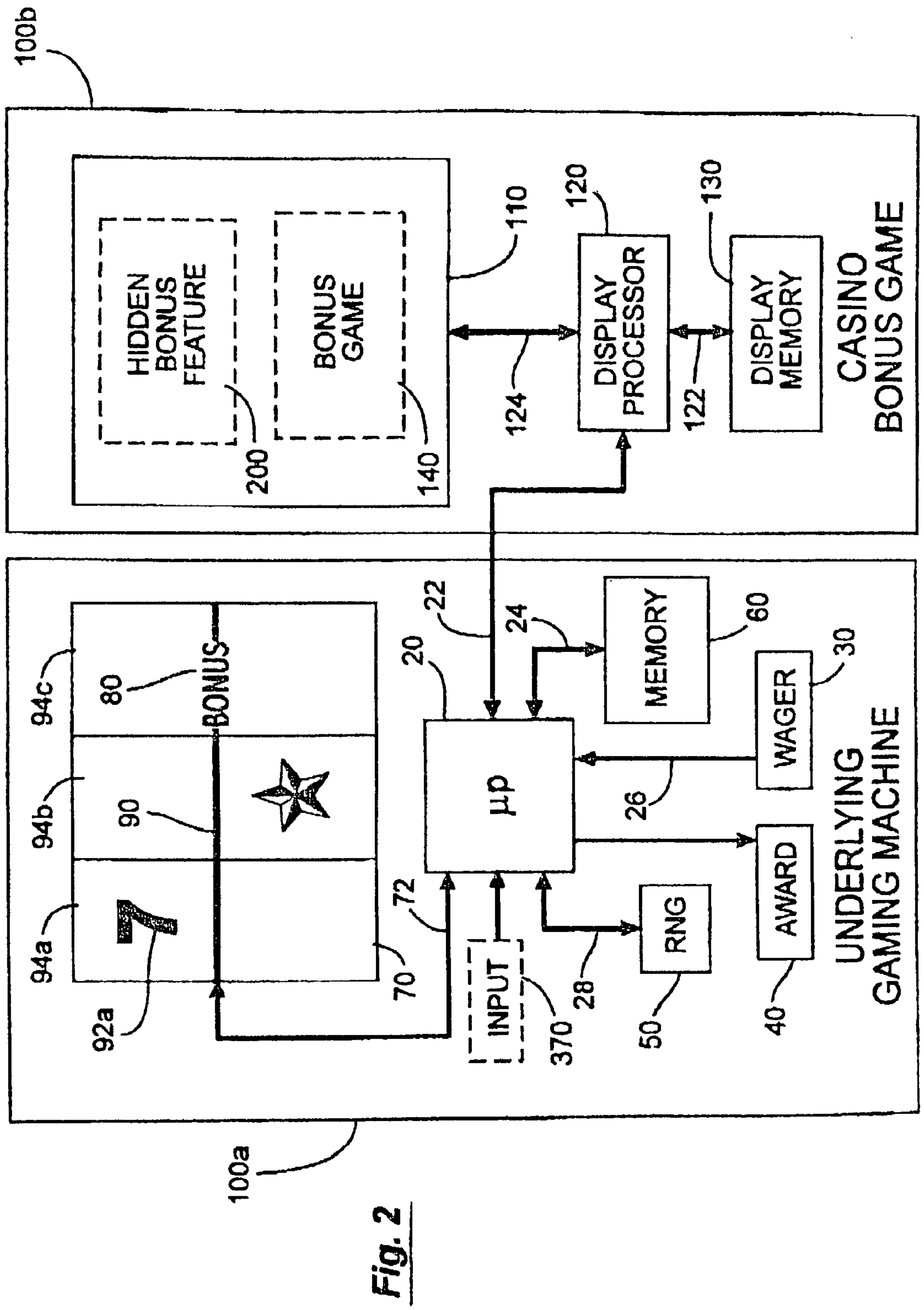
FIG. 2 sets forth the hardware configuration of an underlying casino gaming machine having a casino bonus game incorporating the hidden bonus feature of the present invention.

In FIG. 2, the conventional underlying gaming machine 100*a* such as a slot machine has a separate bonus game 100*b* conventionally triggered by a bonus condition such as the bonus symbol 80 on pay line 90. The provision of a bonus symbol 80 on the pay line 90 is also conventional and it is well known that underlying gaming machines 100*a* such as slot machines can have a bonus condition(s) randomly occur which results in a player having the opportunity to play the bonus game 100*b*. In FIG. 2, the microprocessor 20 over line 22 delivers the bonus condition to the casino bonus game 100*b*. When the bonus condition 80 occurs, which may be any suitable bonus condition, the player's attention is directed to the display 110 of the casino bonus game 100*b*.

The bonus condition can be any suitable bonus condition and is not limited to a bonus symbol 80 appearing on the pay line 90. Whatever causes a bonus condition to occur in the play of the underlying game 100*a* causes play of the casino bonus game 100*b* (either in a separate display 110 as shown in FIG. 2 or in the same display 70 as the underlying game 100*a*). As the player plays the bonus game 140 in display 110, the hidden bonus feature of the present invention may occur. It is an advantage that any type of casino bonus game 100*b* including random-play games, strategic-based casino bonus games, knowledge-based bonus games or skill-based bonus games could all be utilized with the hidden bonus feature 200 of the present invention.

The hidden bonus feature 200 of the present invention is shown in FIGS. 1 and 2. The hidden bonus feature 200 does not have a separate indicator indicating the existence of the hidden bonus feature. Rather, the hidden bonus feature 200 of the present invention occurs, randomly in one embodiment, without warning to the player and further awards and creates excitement for the player when a correct response is received from the player.

The term "casino game" is defined herein to include any gaming machine 10, underlying gaming machine 100*a* having a bonus game 100*b* implemented with a computer-based control 20 such as illustrated with a microprocessor in FIGS. 1 and 2, or any type of bonus game 100*b*. The hidden bonus feature 200 can be implemented in a gaming machine 10, in a bonus game, in both the underlying gaming machine and the bonus game, in only the underlying gaming machine (and not the bonus game), in only the bonus game (and not the underlying gaming machine), etc. As will be pointed out later, the casino game can be part of a wide area progressive or played over the Internet or other online environment. Such casino games are regulated in various jurisdictions by suitable regulations ensuring fairness to both players and casinos.

Method.

Figure 3:
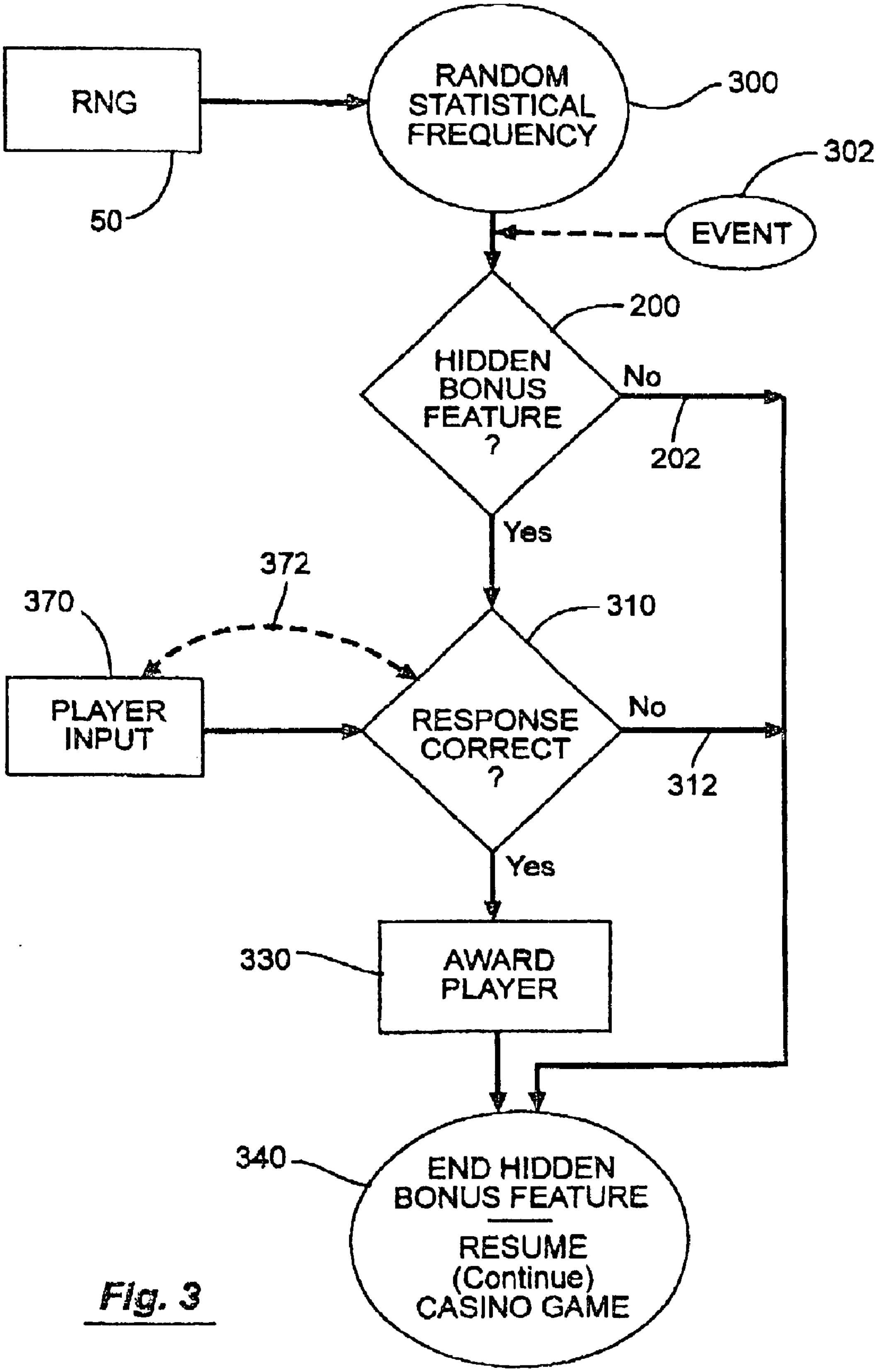
FIG. 3 sets forth one embodiment for the method of the present invention showing the various method steps for implementing the hidden bonus feature of the present invention into a casino game.

The method for implementing the hidden bonus feature 200 of the present invention is shown in FIG. 3 and can be implemented in suitable software in the gaming machine 10 of FIG. 1, in the underlying gaming machine 100*a* and casino bonus game 100*b* of FIG. 2 or in casino games having a single video display for both the underlying game and the bonus game.

The hidden bonus feature 200 shown in FIG. 3 starts 300, in one embodiment, at the same point in time or at different times in the casino game, but whether it occurs can also be determined at a random statistical frequency based on the input from the random number generator 50. The occurrence of the hidden bonus feature can be, in another embodiment, based on an event 302. For example, such an event 302 may occur when the player wins 100 credits or more in the underlying casino game. Or, the event 302 may occur when a game symbol 92 or combination of symbols 92 appears in play of the casino game. The occurrence of the hidden bonus feature 200 is vigorous and is not limited to the above embodiments. Any event 302 that invokes the occurrence of the hidden bonus feature 200 can be used. As additional examples, but not meant to limit the invention, the event 302 can be triggered on a given or randomly selected number of coin-ins to the underlying game; on a given or randomly selected number of bonus game 140 plays; on a given or randomly selected number of credits won in the underlying game (whether or not it is the same player); on the occurrence of a given timed period, given time of the day, or randomly selected time period or time of day; etc.

In one embodiment, nothing is displayed at all to the player when the hidden bonus feature 200 occurs. In this embodiment, the hidden bonus feature 200 may be a function of the outcome of the casino game (i.e., game outcome). In an example of a slot casino game, the hidden bonus feature 200 occurs with a predetermined combination (or alignment) of a game symbol 92 or game symbols 92 as an event 302, such as, by way of an example, four watermelons (not shown). In which case, the award for the hidden bonus feature 200 is obtained by the player touching the fourth watermelon to receive 2× the standard payout. The response 310 from the player is the touching 370 of the fourth watermelon on the touch screen display 70. If the player touches 370 any other watermelon or symbol 92 nothing happens as these are incorrect responses. Likewise, if the player wagers and spins the reels 94 again, this is an incorrect response 310 for the hidden bonus feature 200. What the hidden bonus feature 200 is and/or how to respond is not known to the player. In the above watermelon example, the player does not know from any separate activated indicator (such as found in the GB 2262642 A reference, supra) that the hidden bonus feature 200 is occurring, that it is "four watermelons" or that the player must touch 370 the "fourth watermelon" to receive the 2×(or whatever the desired bonus is). In one variation, the player responding 310 in an incorrect manner (e.g., by touching the second watermelon) negates the feature. In another variation, an incorrect response 310 on the part of the player does not negate the feature, which remains eligible to be "discovered" and is only negated when the reels 94 are again spun to initiate the next play on the machine (e.g., causing any pre-determined time period timer to immediately time out) or when a pre-determined time period times out. This is shown by dotted lines 372 in FIG. 3. The time it takes for a player to input 370 after the hidden bonus feature 200 occurs, in a variation, results in a higher payoff to the player in step 330. In this variation, the method would start a timer and measure the amount of time for the correct response 310 to be input 370. The method, either in a look-up table or a software determination, would then provide a higher award 330 for a faster input 370 resulting in a correct response 310.

In another variation, when the four watermelons line up, the hidden bonus feature 200 may be to touch the fifth symbol on that line or to touch any non-melon, etc. The hidden bonus feature 200 then becomes touching this other symbol which may turn into a melon, etc. Or, it may be to touch any non-melon symbol whose position becomes wild, etc. It is to be understood that many variations and other embodiments can be utilized and the examples presented herein do not limit the scope of the present invention. The watermelon example is but one of many. Additional examples of events 302 based on game outcomes are: a card combination in a casino card game (e.g., three aces), a number combination in a video keno casino game (e.g. appearance of "7, 17, 27"), etc. Again, the player input 370 is also vigorous. In the case of three aces, touching any ace, the first ace, the last ace, or simply the screen 70 can be selected as correct responses 310 under the teachings of the present invention.

In another variation, the hidden bonus feature 200 can occur when an event 302 is combination of game symbols 92 that happens during play of a casino game such as, for example, when a card combination is initially dealt to a player such as in a video poker game. Here, for example, the hidden bonus feature 200 occurs when the combination initially dealt to the player has two red queens (i.e., the event 302). The correct response 310 from the player is to touch 370 either red queen. The predetermined game symbols as events 302 in a casino game can be one, two, or any suitable number. For example, in a Wild Deuces video poker casino game, the hidden bonus feature 200 can be a single jack which can appear as the event 302 in the initial hand or any subsequent cards dealt. The player's correct response 310 would be to slap the jack, by touching 370 the card, to receive an award 330. The event 302 based on a symbol or combination of game symbols can occur "during play," that is, at any time from the start to the end of the casino game.

The casino game may be interrupted, in another embodiment, in order to activate the hidden bonus feature 200. The play of the casino game is implemented in software run by the microprocessor 20, and this software program permits the execution of the hidden bonus feature 200 software. This execution can occur, at the outset, such as just after the player places a wager 30 in the casino game, it can occur any time during the play of the casino game (e.g., underlying game or bonus game), or it can occur near the end of play of the casino game. Or, it can occur at a set time during play of the casino game such as, in the case of a slot game 100 of FIG. 1, in response to the player providing an input 370 to cause the slotreels 94 to start turning, while the reels 94 are spinning, or after the reels 94 stop. In the case of the casino bonus game **100*b* of FIG. 2, the hidden bonus feature 200 can also be activated at the start, during, or at the end of the casino bonus game 100*b*. The occurrence of the hidden bonus feature 200 does not interfere with the normal play of the casino game. In other words, after display of the hidden bonus feature 200, play resumes 340 by returning to the underlying computer software for continued play of the casino game. In one embodiment, the interruption of the play of the casino game to activate the hidden bonus feature 200 and returning to resume play of the casino game occurs in a fashion so as not to interfere with the outcome of the casino game. When one or a combination of gaming symbols 92 appears 302 to activate the hidden bonus feature 200, if the player does not respond with an input 370 when the hidden bonus feature 200 occurs, play continues 340 conventionally. The player's input 370 and correct response 310, however, cause the bonus award 330 to be delivered. Stated another way, the occurrence of the hidden bonus feature 200 and any award 330** provided is independent of the play of the casino game.

In reference to FIG. 3, the occurrence of the hidden bonus feature 200 may not occur and path 202 is entered for casino game play to continue, or the response 310 is incorrect and path 312 is entered for the casino game to continue. In one variation, the player input 370 for a correct response in step 310 must be received in a predetermined period of time such as in two seconds and, if not received, path 312 is entered. In another variation, the player may be able to keep re-tying 372 to input 370 the correct response 310 within a predetermined time period such as in three or four seconds. Once the hidden bonus feature 200 of the present invention is over, the casino game resumes (continues) 340 play as if it never happened.

The occurrence of the hidden bonus feature 200 in display 70 or 110 occurs as follows when based on randomness 300. The microprocessor 20 upon receiving the random number input 28 from the random number generator 50 activates the hidden bonus feature 200. During all play over time of the casino game, the occurrence of the hidden bonus feature 200 is random. Any of a number of different types of random number generator programs and hardware devices 50 could be used under the teachings of the present invention. As before, when the hidden bonus feature 200 occurs, the player is given an opportunity to respond 310 through a player input device 370. The player input device 370 can be any number of conventionally available input devices. For example, player input 370 could be incorporated in the touch screen display 110 at a suitable location such as touching the display of the hidden bonus feature 200. Or, it could be located on the gaming machine 10 or the underlying gaming machine 100*a* as a separate input device 370 shown in dotted lines in FIGS. 1 and 2. Again, player input devices 370 are well known in the gaming industry and any suitable player input device 370 could be utilized under the teachings of the present invention.

When the player response 310 is not correct, the hidden bonus feature 200 is over and, in one embodiment, the casino game resumes 340. In another embodiment, the casino game continues while the hidden bonus feature 200 is still displayed. If the player response 310 is correct, then the player is awarded 330 such as by increasing the award 40.

In the play of the method shown in FIG. 3 the hidden bonus feature 200 occurs on the screen 70, 110 without the use of a separate indicator. The player must provide a correct response 310. In one embodiment, no clues, no hints, no information whatsoever is given to the player while the hidden bonus feature 200 occurs.

In another embodiment, the "existence" of the hidden bonus feature 200 is generally made known on the face of the casino game such as: "This Game has a Hidden Bonus That Pays $20," "This Game Has Mystery Bonus—Can you Figure It Out?" In the case of the slap jack hidden bonus feature 200 example above, the "existence" may be made known on the gaming machine: "Slap Jack Hidden Bonus." In the case of the four watermelons (and, for example, touching the fourth watermelon), the existence may be known on the gaming machine 10 such as "Watermelon Hidden Feature".

What is important is that while the "existence" of a hidden bonus feature 200 (somewhere within the casino game) may be alluded to or otherwise generally made known on the gaming machine, the occurrence of the hidden bonus feature 200 during the casino game is not overtly displayed to the player with the use of a separate indicator. In this fashion, unknowledgeable players are not frustrated at knowing they're supposed to do something and failing. Knowledgeable players are still rewarded.

The hidden bonus feature 200 of the present invention is a special attraction to the players in that it occurs, perhaps suddenly as a graphic (or the combination of game symbols 92 appear suddenly appears) on the display 110 to the player. As such, it may surprise the player. It may well be that others watching the player may educate the player as to what to do (i.e., touch the parrot or "You have four watermelons, hurry and touch the last watermelon!"). This all adds to the surprise, excitement, and perhaps mysteriousness surrounding the hidden bonus feature 200 of the present invention.

Figure 4:
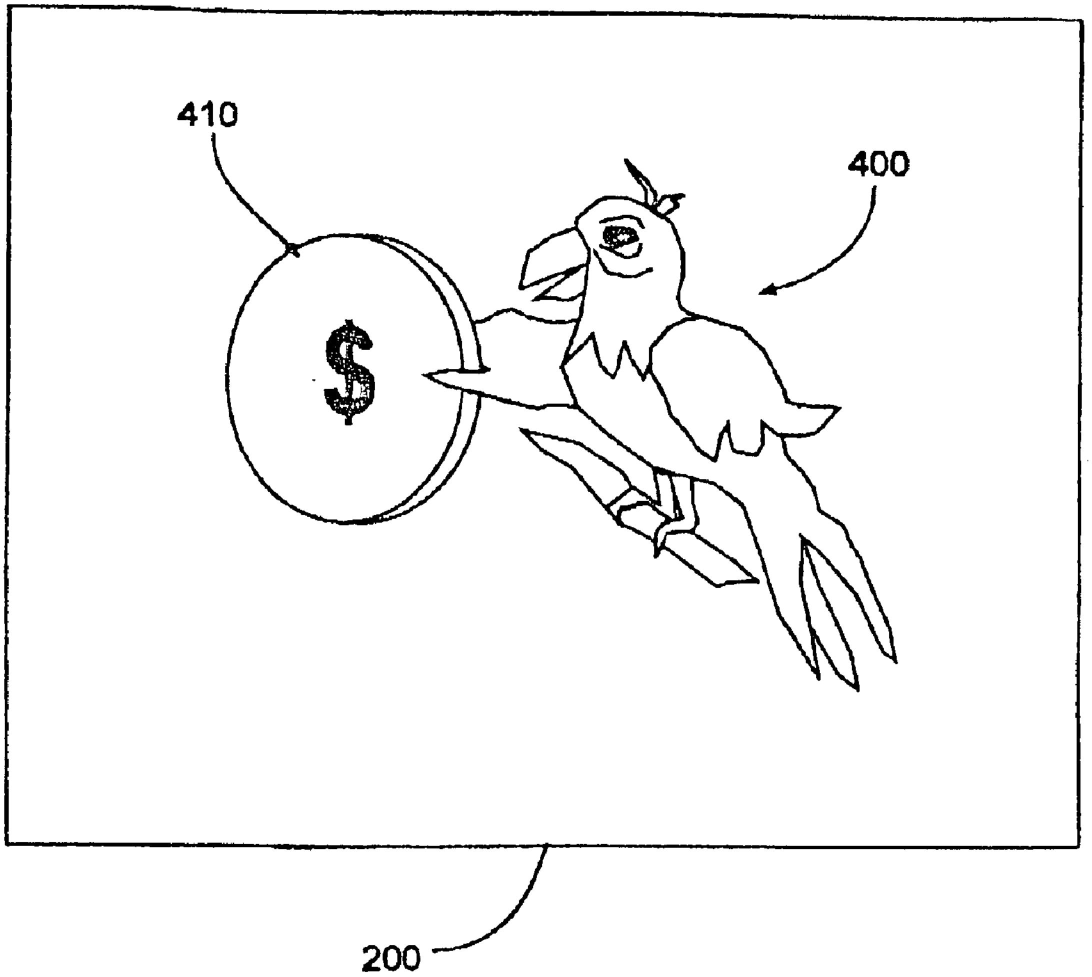
FIG. 4 is an illustration of a hidden bonus features of the present invention.

In FIG. 4, an example of a hidden bonus feature 200 when displayed is shown. During play of the casino gaming machine 10 or the casino bonus game 100*b*, according to the method of FIG. 3, a parrot 400 suddenly appears on screen 110 in an animated sequence such as flipping a gold coin 410. In this embodiment, this is a "cue" and the player has now been "cued." The player must correctly respond 310 in a predetermined time frame such as three seconds after the cue by touching 370 the displayed image 400. For example, a video representation of a statue holds a plate of fire. When the fire changes to a fountain of water, this is the hidden bonus feature.

Hence, if the player does not respond correctly 310 in the predetermined time frame in stage 310, then the hidden bonus feature 400 goes away and play 340 of the casino bonus game 100*b* or play of the gaming machine 10 resumes. If the player correctly responds in stage 310, then the award in stage 330 is given to the player. A cue in this embodiment is defined herein as a subtle feature integrated into the hidden bonus feature 200. The cue of the present invention is integrated within the hidden bonus feature 200 only when it is displayed (or when it occurs) and is not separately indicated in the casino game as taught by GB 2262642 A, supra. The subtle feature constituting the cue is formed with and/or coordinated with the hidden feature in many possible embodiments and variations. The integrated cue, to a new or uninitiated player would have no meaning, but to an initiated player who has discovered the meaning it would. A "cue" and/or a "cue message", in this embodiment, always appears as part of the hidden bonus feature 200 and not, as a separate indicator. An integrated cue is not needed for many of the hidden bonus features 200 discussed herein. For the example of the four watermelons, there is no cue as the appearance of the four watermelons is the hidden bonus feature 200.

As another example, the graphic displayed is a variation of one the player has come to expect. As an example, the parrot 400 may be used as the "emcee" in a knowledge-based bonus game on an underlying slot machine. As the trivia question and answers are shown to the player in the bonus game, he may cheer on the player with phrases such as "Let's get this one!" "This one's a gimme!" "I love you!" and so forth. As a hidden bonus feature 200, he may, instead of one of the standard phrases, randomly flip a gold coin and ask, "Who wants some credits!" To the initiated observer, this is a subtle cue. To the uninitiated observer, this particular phrase, and its timing, looks much like any of the many other phrases and actions the parrot 400 may do. However, when the player touches 370 the parrot 400 on the display within three seconds, a random award 330 is given to the player. If the player does nothing, or first touches 370 a response to the trivia answer, then no hidden award 330 is given and path 312 is entered for continuation of the casino. The use of a cue adds excitement to the casino game since while the player is uninitiated, an observer may yell out what to do upon seeing the cue.

In another embodiment of the present invention, the correct action 370 to take during the occurrence of a hidden bonus feature 200 is touching (via touch screen) the object in question. This is a simple but effective means for the player to respond to the machine in a fashion that acknowledges that the hidden bonus feature 200 has been discovered. It is an advantage of this approach that the player need not memorize complicated sequences of button pushes and so forth, which more resemble an exam than a game of entertainment. It is an advantage of this approach that the player who discovers the feature then has no further memorization to do.

Under another embodiment of the present invention, the hidden bonus feature 200 can be any type of cue to the player. The hidden bonus feature 200 can be an animated sequence, a video sequence, a graphic, a letter or number, a casino logo, a sound, etc. The present invention is not limited to the form, shape or type of hidden bonus feature 200 used. Furthermore, when the hidden bonus feature 200 is not to be displayed, an alternate feature can be displayed. For example, the parrot 400 can be displayed in an animated sequence simply flapping its wings without showing the gold coin 410.

In one embodiment of the present invention, some mode of timing is utilized in conjunction with the hidden bonus feature 200. A clock, internal timer, etc., such as for three seconds can be used. Alternatively, the player may have no time limit per se in step 310, except that if the hidden bonus feature 200 is not responded to as the first response, then it goes away. As an example of this alternative, consider a trivia-based bonus game with a hidden bonus feature 200. The hidden bonus feature 200 may be on-screen motion (e.g., a bird 400 flipping a gold coin 410), or perhaps a change in artwork that the player sees (e.g., an orange sun instead of a yellow sun). Provided the player responds 312 correctly, by first touching 370 the element that comprises the hidden bonus feature 200, before selecting an answer to the trivia-based bonus game, the hidden bonus feature 200 is awarded 330. On the other hand, if the player selects and answers the trivia question, the hidden bonus feature 200 is not awarded.

The hidden bonus feature 200 of the present invention may, as discussed earlier, interrupt the play of the casino game, be part of the play of the casino game, or occur in parallel with the play of the casino game as discussed above with the parrot graphic 400. The present invention uses a hidden bonus feature 200 occurring in a display 70, 110 of the casino game to the player. In one embodiment, the hidden bonus feature 200 is not disclosed to the player in the instructions for or on the casino game. Alternatively, the casino game may be denoted as having a hidden bonus feature 200 existing, but with no other information about the hidden bonus feature 200 disclosed to the player such as what it is, when it occurs, why it occurs, or how to respond. The hidden bonus feature 200 of the present invention is a bonus in that it delivers an award 330 in addition to what is normally expected by the player during play of the casino game.

Wide Area Progressive.

Figure 5:
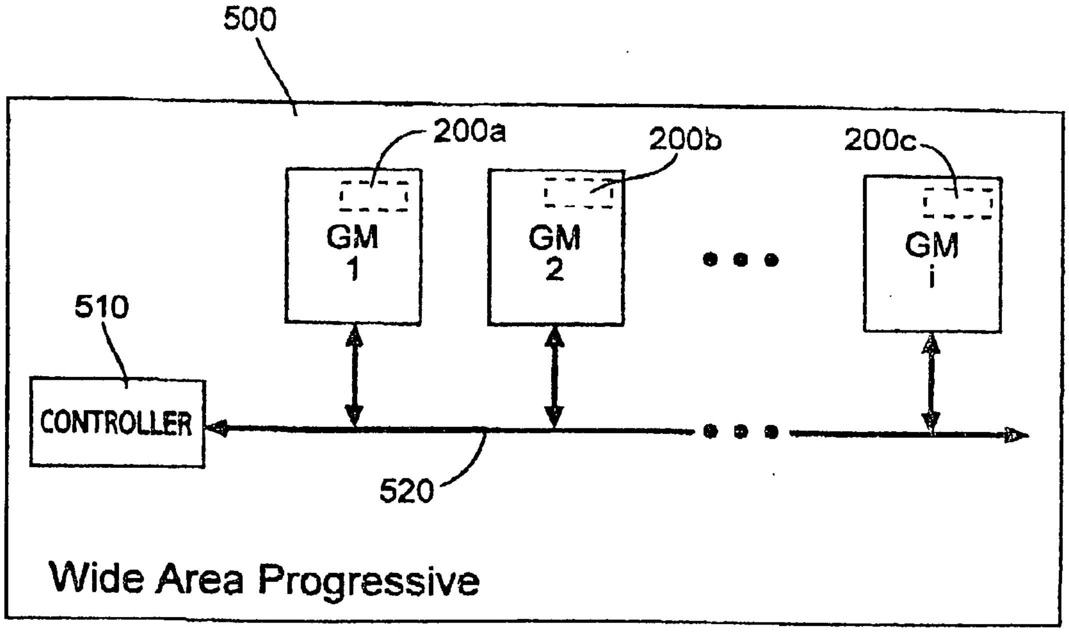
FIG. 5 is the implementation of the hidden bonus feature of the present invention into a wide area progressive.

The interrupt in the play of the casino game and the occurrence of the hidden bonus feature 200 can also be the result of a wide area progressive interrupt. For example, in one variation of the present invention, the hidden bonus feature 200 interrupts play of the casino gaming machines GM interconnected into a wide area progressive system 500 as shown in FIG. 5. In such wide area progressive systems 500, a central controller 510 is used to control the wide area progressive system 500. The method of the present invention can be implemented into the central controller 510 for play of a casino gaming machine GM in a plurality of casino gaming machines GM all interconnected over a bus 520 in a wide area progressive system 500. As shown in FIG. 1, a port 140 interfaces the microprocessor 20 to the bus 520.

In operation and in reference to FIG. 5, the player sitting at a gaming machine GM would not be aware of how to respond to the hidden bonus feature 200. No information on how to respond to the hidden bonus feature 200 would be found at any one of the gaming machines GM. For example, a random number generator would cause the controller 510 to provide at one of the gaming machines GM the hidden bonus feature 200. As previously discussed, the player sitting at that gaming machine GM would have the opportunity to correctly respond to the hidden bonus feature 200 and collect an additional award 330. If an incorrect response 310 occurs, the play of the gaming machine GM is conventional 340. It is to be expressly understood that there are a variety of wide area progressive system 500 configurations and that such system 500 configurations can be adapted to include an island of gaming machines, gaming machines spread across a casino, gaming machines interconnected together amongst a variety of casinos or a progressive system 500 connected over a network or over the Internet. Again, the topological configuration of a wide area progressive system 500 does not affect the teachings of the hidden bonus feature 200 of the present invention.

Figure 7:
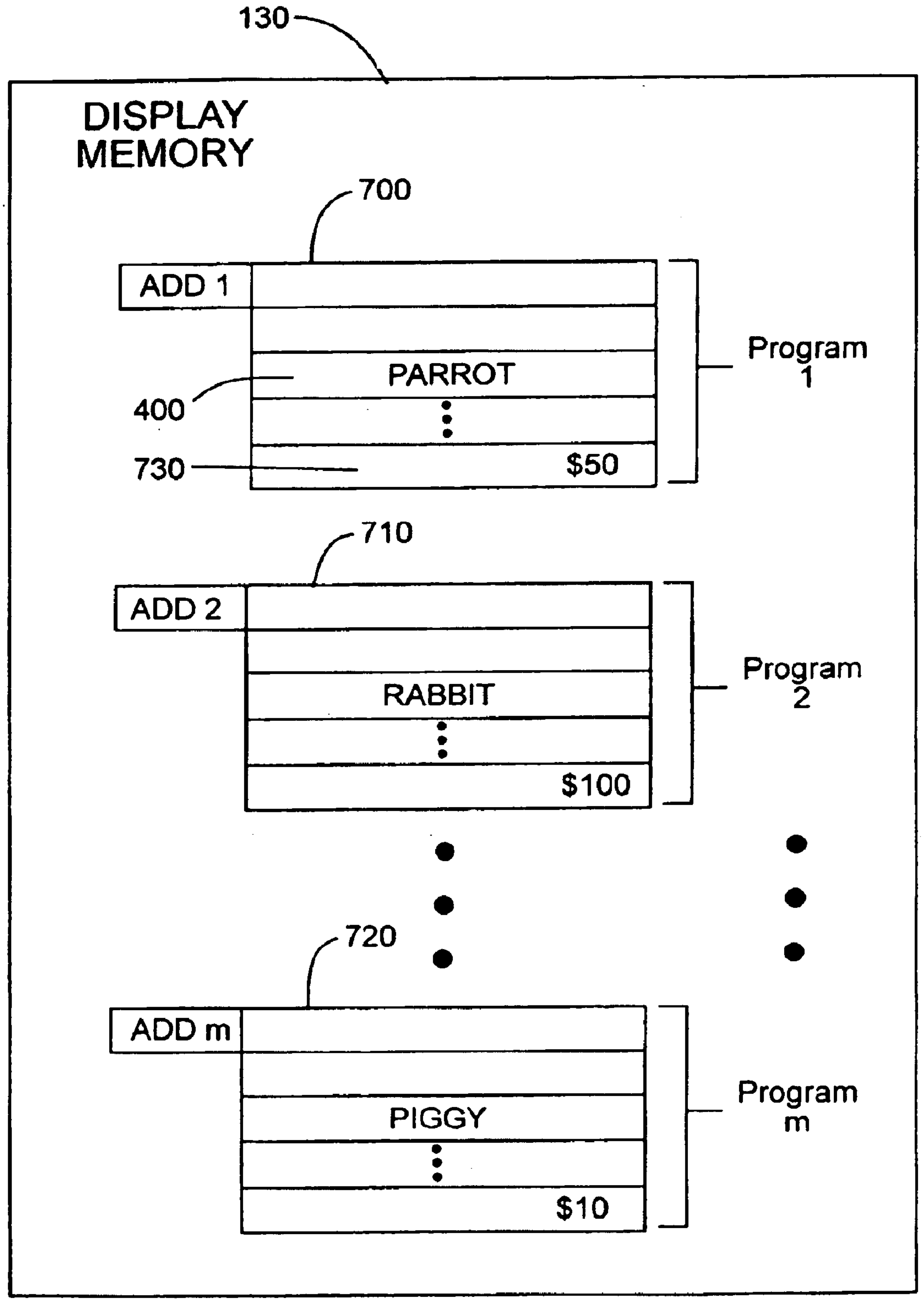
FIG. 7 sets forth a number of programs in memory for implementing various hidden bonus features of the present invention.

In FIG. 7 a variety of programs could be utilized to implement the hidden bonus feature 200 of the present invention. For example, in FIG. 7, the display memory 130 could have a first program 700 which can be selectively implemented by the display processor 120 based upon an address 710. In this first program 700, a parrot 400 as shown in FIG. 4 is displayed. The value stored at 730 is $50. Separate programs 710 and 720 could exist for different visual hidden bonus features 200 such as a rabbit showing $100 or a piggy showing $10. The present invention is vigorous in that the same program 700 could always be used showing, for example, a parrot 400 as shown in FIG. 4 using the same value (i.e., 50 coins) or using different values with the same visual image. On the other hand, the different programs 700, 710, 720 could be randomly selected to provide a wide variety of hidden bonus features 200. Internet.

In another variation of the present invention, the casino gaming machine 10 is a player's own personal computer PC interconnected to a central computer 600 over the Internet 610. It Is immaterial whether the casino game is being played in the software in the player's personal computer PC or whether the player's personal computer PC operates as an input/output device for the casino game being operated by software in the central computer 600.

Figure 6:
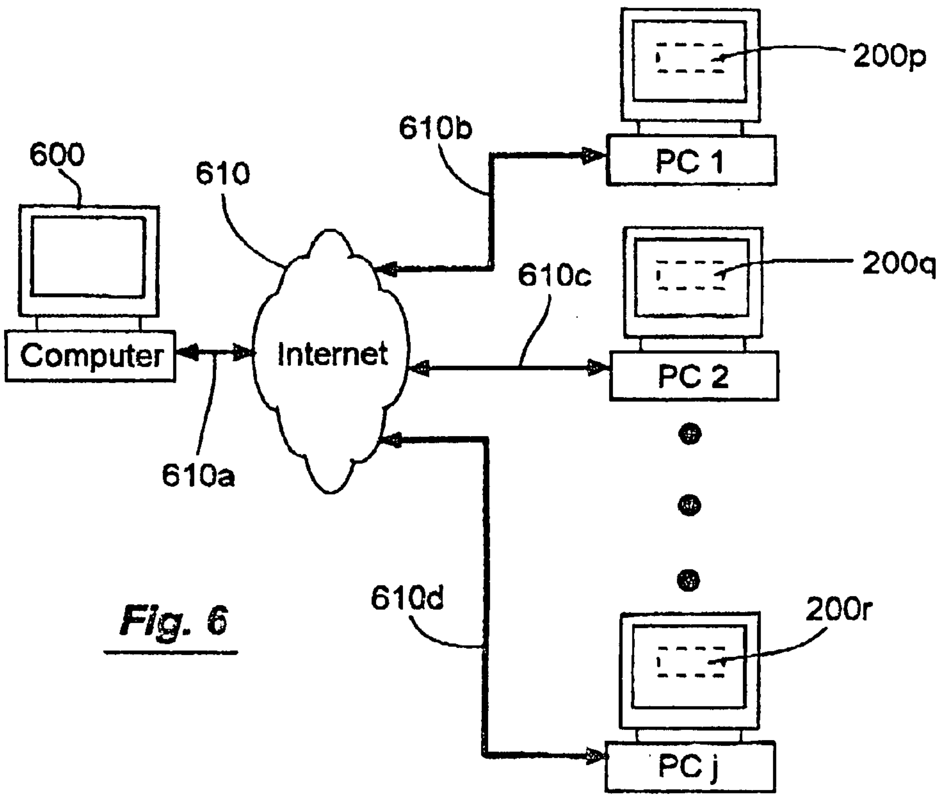
FIG. 6 is the implementation of the hidden bonus feature of the present invention into an Internet gaming environment.

In FIG. 6, the computer 600 is located at a remote location and communicates 610*a* over the Internet 610 to a plurality of personal computers PC 1-PC j. The communication links 610*a*, 610*b*, 610*c* and 610*d* are conventional and use of the Internet 610 to establish such communication links 610*a–d* is well known and not material to the present invention. In the same fashion, as discussed above for the wide area progressive 500, the computer 600 causes a hidden bonus feature 200 such as bonus features 200*p*. 200*q* and 200*r* shown on computers PC1, PC2, and PCj, respectively, in FIG. 6 to occur on a personal computer PC while a player is playing a casino game. Again, if the player correctly responds 310 to this occurrence, the player receives an award 330 and, if the player incorrectly responds 310, the game continues.

Summary of Method.

Figure 8:
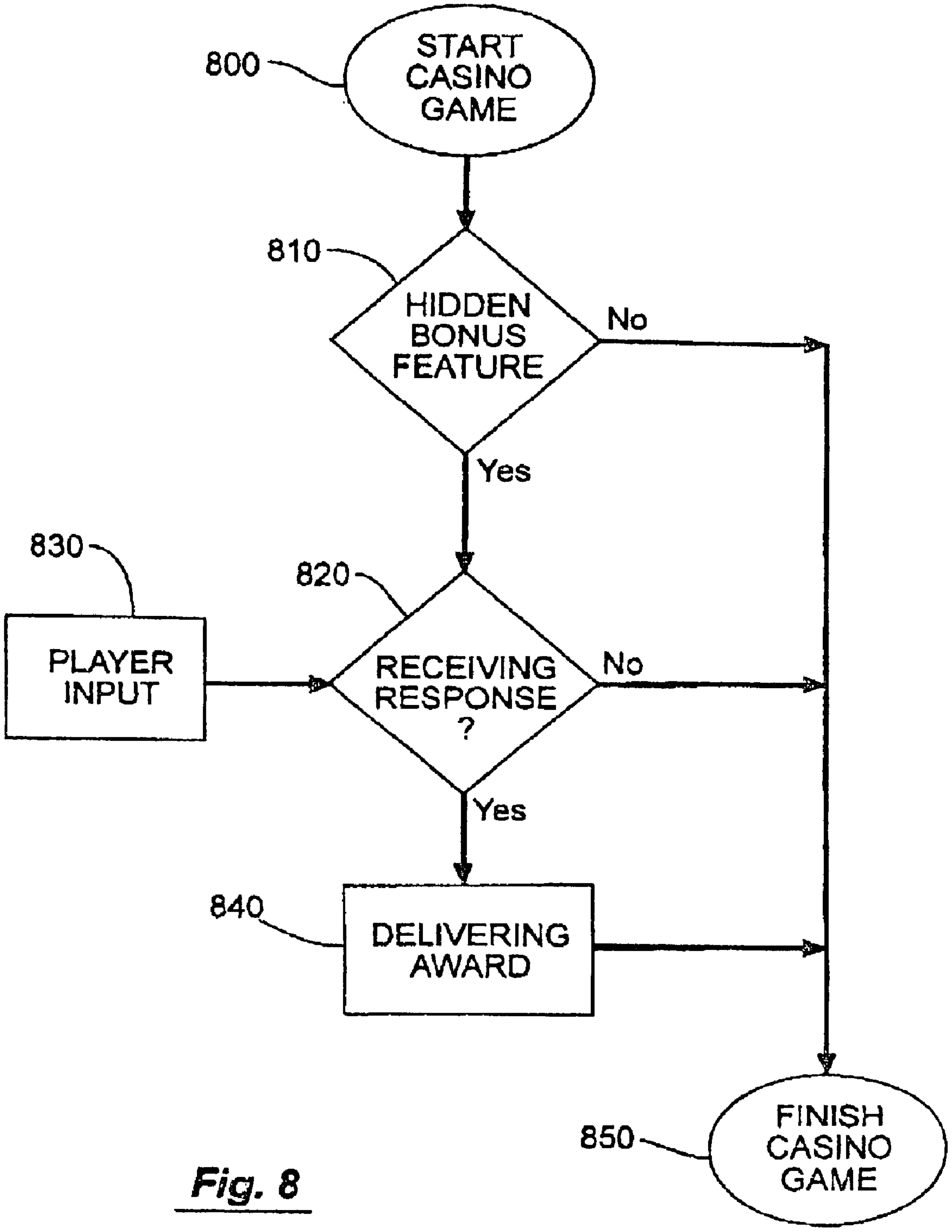
FIG. 8 sets forth the method of the present invention.

In FIG. 8, the method of the present invention is set forth as implemented in a casino game (FIGS. 1 and 2); in a wide area progressive (FIG. 5); or over the Internet (FIG. 6). The casino game starts 800 such as, but not limited to, coin-in, sign-on, entering a bonus game based on a bonus condition, etc. As the casino game is played (or played to conclusion), a hidden bonus feature 200 may be provided 810. The step of providing 810 a hidden bonus feature 200 may occur randomly (FIG. 3 from RNG 300, the appearance of a game symbol or combination of game symbols, etc.) or upon a predetermined event in the casino game (FIG. 3 from event 302 such as a predetermined number of coin-ins, payout credits, etc.). When no hidden bonus feature 200 is provided, then the casino game is conventionally finished 850. When the hidden bonus feature 200 is provided it is no longer hidden and the player responds 820 with an input 830. If the response 820 is correct, an award is delivered 840. If there is no input 830 or if the response 820 is not correct, then step 820 allows the casino game to be conventionally finished 850.

The above disclosure sets forth a number of embodiments of the present invention. Those skilled in this art will however appreciate that other arrangements or embodiments, not precisely set forth, could be practiced under the teachings of the present invention and that the scope of this invention should only be limited by the scope of the following claims.

I claim:

1. A method for awarding a player of a casino game comprising:

providing a hidden bonus feature on a display touch screen to the player in the casino game, the casino game not having a separate indicator indicating to the player when the hidden bonus feature occurs, wherein the hidden bonus feature has an integrated cue that the hidden bonus feature has been displayed, receiving a single touch response on the displayed hidden bonus feature in the display touch screen of the casino game from the player after providing the hidden bonus feature, delivering a bonus award in the casino game to the player when the single touch response on the displayed hidden bonus feature on the display touch screen occurs.

2. The method of claim 1 wherein providing the hidden bonus feature occurs when one or a predetermined combination of game symbols appears in the casino game during play of the casino game on the display touch screen.

3. The method of claim 1 wherein providing the hidden bonus feature occurs when a predetermined event occurs in the casino game on the display touch screen.

4. The method of claim 1 wherein providing the hidden bonus feature randomly in the casino game on the display touch screen.

5. The method of claim 1 wherein the casino game is played in a gaming machine.

6. The method of claim 1 wherein providing the hidden bonus feature originates in a controller of a progressive system connected to the casino game.

7. The method of claim 1 wherein playing of the casino game by the player occurs over the Internet.

8. The method of claim 1 wherein the hidden bonus feature is an animated sequence.

9. The method of claim 8 wherein the hidden bonus animated sequence is a variation of animated sequences appearing in the casino game.

10. The method of claim 1 wherein the hidden bonus feature is a graphic.

11. The method of claim 10 wherein the graphic is a variation of graphics appearing in the casino game.

12. The method of claim 1 wherein the hidden bonus feature is provided at the same point in the casino game.

13. A method for awarding a player of a casino game comprising:

providing a hidden bonus feature on a display touch screen to the player in the casino game, the casino game not having a separate indicator indicating to the player when the hidden bonus feature occurs, receiving a single touch response on the displayed hidden bonus feature in the display touch screen of the casino game from the player after providing the hidden bonus feature, delivering a bonus award in the casino game to the player when the single touch response on the displayed hidden bonus feature on the display touch screen occurs, wherein the bonus award is independent of the play of the casino game, players correctly responding to said hidden bonus feature receiving a higher expected return than players not correctly responding to the hidden bonus feature.

14. A method for awarding a player of a casino game comprising:

providing a hidden bonus feature on a display touch screen to the player in the casino game, the casino game not having a separate indicator indicating to the player when the hidden bonus feature occurs.

receiving a single touch response on the displayed hidden bonus feature in the display touch screen of the casino game from the player after providing the hidden bonus feature, delivering a bonus award in the casino game to the player when the single touch response on the displayed hidden bonus feature on the display touch screen occurs, wherein the casino game is a bonus game and wherein the bonus game is played in conjunction with an underlying game played on a gaming machine.

15. A method for awarding a player of a casino game comprising:

providing a hidden bonus feature on a display touch screen to the player in the casino game, the casino game not having a separate indicator indicating to the player when the hidden bonus feature occurs, wherein the hidden bonus feature is an animated sequence and wherein the animated sequence is a variation of animated sequences appearing in the casino game, receiving a single touch response on the displayed hidden bonus feature in the display touch screen of the casino game from the player after providing the hidden bonus feature, wherein the response from the player is the player touching the hidden bonus animated sequence appearing on the touch screen display, delivering a bonus award in the casino game to the player when the touch response on the displayed hidden bonus feature on the display touch screen occurs.

16. A method for awarding a player of a casino game comprising:

providing a hidden bonus feature on a display touch screen to the player in the casino game during a predetermined time period, the provided hidden bonus feature having an integrated cue that the hidden bonus feature has been displayed, receiving a single touch response on the displayed hidden bonus feature in the casino game from the player after providing the hidden bonus feature, delivering a bonus award in the casino game to the player when the single touch response on the displayed hidden bonus feature on the display touch screen from the player occurs.

17. The method of claim 16 wherein the faster a player touches the displayed hidden feature in the predetermined time period, the greater the award.

18. The method of claim 16 wherein resuming play of the casino game occurs after the predetermined time period times out.

19. The method of claim 16 wherein play of the casino game continues during the predetermined time period.

20. The method of claim 19 wherein if the player provides a response for play of the casino game prior to providing the touch response for the hidden bonus feature, then the predetermined time period immediately times out.

21. A method for awarding a player of a casino game comprising:

providing a hidden bonus feature to the player, the hidden bonus feature having an integrated cue that the hidden bonus feature has been displayed, receiving a single input from the player within a predetermined time period after providing the hidden bonus feature, delivering a bonus award in the casino game to the player when the single input from the player occurs within the predetermined time period, wherein the delivered bonus award is independent of the play of the casino game, the play of the casino game also being independent of the provided hidden bonus feature, the received single input from the player and the delivered bonus award.

22. The method of claim 21 wherein the casino game is played on a gaming machine.

23. The method of claim 21 wherein the casino game is an underlying game on a gaming machine having a casino bonus game.

* * * * *